(12) United States Patent
Hosokoshiyama et al.

(10) Patent No.: US 10,300,670 B2
(45) Date of Patent: May 28, 2019

(54) INJECTION MOLDING PROCESS FOR MAKING A PREFORM

(71) Applicants: Hiroshi Hosokoshiyama, Tokyo (JP); Junichi Chiba, Kanagawa (JP); Yosuke Watanabe, Tochigi (JP)

(72) Inventors: Hiroshi Hosokoshiyama, Tokyo (JP); Junichi Chiba, Kanagawa (JP); Yosuke Watanabe, Tochigi (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 15/829,384

(22) Filed: Dec. 1, 2017

(65) Prior Publication Data

US 2018/0215115 A1    Aug. 2, 2018

Related U.S. Application Data

(62) Division of application No. 14/114,393, filed as application No. PCT/JP2012/059625 on Apr. 9, 2012, now Pat. No. 9,862,157.

(30) Foreign Application Priority Data

Apr. 28, 2011    (JP) ................ 2011-101939

(51) Int. Cl.
*B29C 45/16*    (2006.01)
*B29D 22/00*    (2006.01)
(Continued)

(52) U.S. Cl.
CPC ............ *B29D 22/003* (2013.01); *B29B 11/14* (2013.01); *B29C 45/1603* (2013.01);
(Continued)

(58) Field of Classification Search
None
See application file for complete search history.

(56) References Cited

U.S. PATENT DOCUMENTS

| 4,174,413 A | 11/1979 | Yasuike et al. |
| 4,657,496 A | 4/1987 | Ozeki et al. |

(Continued)

FOREIGN PATENT DOCUMENTS

| JP | S53-83884 A | 7/1978 |
| JP | H02-98409 A | 4/1990 |

(Continued)

OTHER PUBLICATIONS

Apr. 22, 2016 Non Final Office Action issued in U.S. Appl. No. 14/114,393.
(Continued)

*Primary Examiner* — Edmund H Lee
(74) *Attorney, Agent, or Firm* — Oliff PLC

(57) ABSTRACT

Technical problems of this invention is to create an injection molding device and an injection molding process for a test tube shaped preform, that can laminate a colored layer at certain positions of a wall of the reform with a certain thickness in a manner of a high degree of accuracy.

A feature associated with the injection molding device to solve these problem comprising a nozzle section, in which a molten main resin and a molten second resin are join together to form a joined resin mass, the nozzle section comprising: an outer flow channel through which the main resin flows, an inner flow channel through which the second resin flows, a cylindrical column-shaped joined flow channel where the second resin from the inner flow channel joins the main resin from the outer flow channel, a first confluence disposed at a point where the main resin from the outer flow channel flows into the joined flow channel, a second confluence disposed at a point where the second resin flows into (Continued)

the joined flow channel wherein the first confluence is located downstream of the second confluence with a predetermined space left in between, and a cylindrical shutoff pin inserted slidably in the joined flow channel, wherein this shutoff pin is capable of shutting off or opening either or both of the first confluence and/or the second confluence, depending on the sliding position.

6 Claims, 13 Drawing Sheets

(51) Int. Cl.
*B29C 49/00* (2006.01)
*B29C 49/22* (2006.01)
*B65D 1/02* (2006.01)
*B29B 11/14* (2006.01)
*B29K 105/00* (2006.01)
*B29C 49/06* (2006.01)
*B29L 31/00* (2006.01)
*B29C 49/10* (2006.01)
*B29C 45/28* (2006.01)

(52) U.S. Cl.
CPC ...... *B29C 45/1646* (2013.01); *B29C 49/0073* (2013.01); *B29C 49/221* (2013.01); *B65D 1/0207* (2013.01); *B65D 1/0215* (2013.01); *B29B 2911/1402* (2013.01); *B29B 2911/1404* (2013.01); *B29B 2911/1408* (2013.01); *B29B 2911/1412* (2013.01); *B29B 2911/14066* (2013.01); *B29B 2911/14073* (2013.01); *B29B 2911/14086* (2013.01); *B29B 2911/14326* (2013.01); *B29C 45/2806* (2013.01); *B29C 49/06* (2013.01); *B29C 49/10* (2013.01); *B29K 2105/253* (2013.01); *B29K 2995/0021* (2013.01); *B29K 2995/0067* (2013.01); *B29K 2995/0069* (2013.01); *B29L 2031/7158* (2013.01)

(56) References Cited

U.S. PATENT DOCUMENTS

| | | | |
|---|---|---|---|
| 4,895,504 | A | 1/1990 | Kudert et al. |
| 4,923,723 | A | 5/1990 | Collette et al. |
| 4,934,915 | A | 6/1990 | Kudert et al. |
| 5,595,799 | A | 1/1997 | Beck et al. |
| 6,322,344 | B1 | 11/2001 | Maruyama et al. |
| 6,344,249 | B1 | 2/2002 | Maruyama et al. |
| 6,440,350 | B1 | 8/2002 | Gellert et al. |
| 6,648,622 | B1 | 11/2003 | Gellert et al. |
| 6,655,945 | B1 | 12/2003 | Gellert et al. |
| 7,344,673 | B2 | 3/2008 | Yokomizo et al. |
| 8,607,999 | B2 | 12/2013 | Toyoda et al. |
| 2002/0036366 | A1 | 3/2002 | Maruyama et al. |
| 2008/0317989 | A1 | 12/2008 | Abe et al. |

FOREIGN PATENT DOCUMENTS

| | | |
|---|---|---|
| JP | H05-253973 A | 10/1993 |
| JP | H11-165330 A | 6/1999 |
| JP | 2002-538994 A | 11/2002 |
| JP | 2008-265188 A | 11/2008 |
| WO | 2010001842 A1 | 1/2010 |

OTHER PUBLICATIONS

Oct. 26, 2016 U.S. Office Action Issued in U.S. Appl. No. 14/114,393.
Jul. 3, 2012 Written Opinion issued in International Patent Application No. PCT/JP2012/059625.
Jul. 3, 2012 Search Report issued in International Patent Application No. PCT/JP2012/059625.

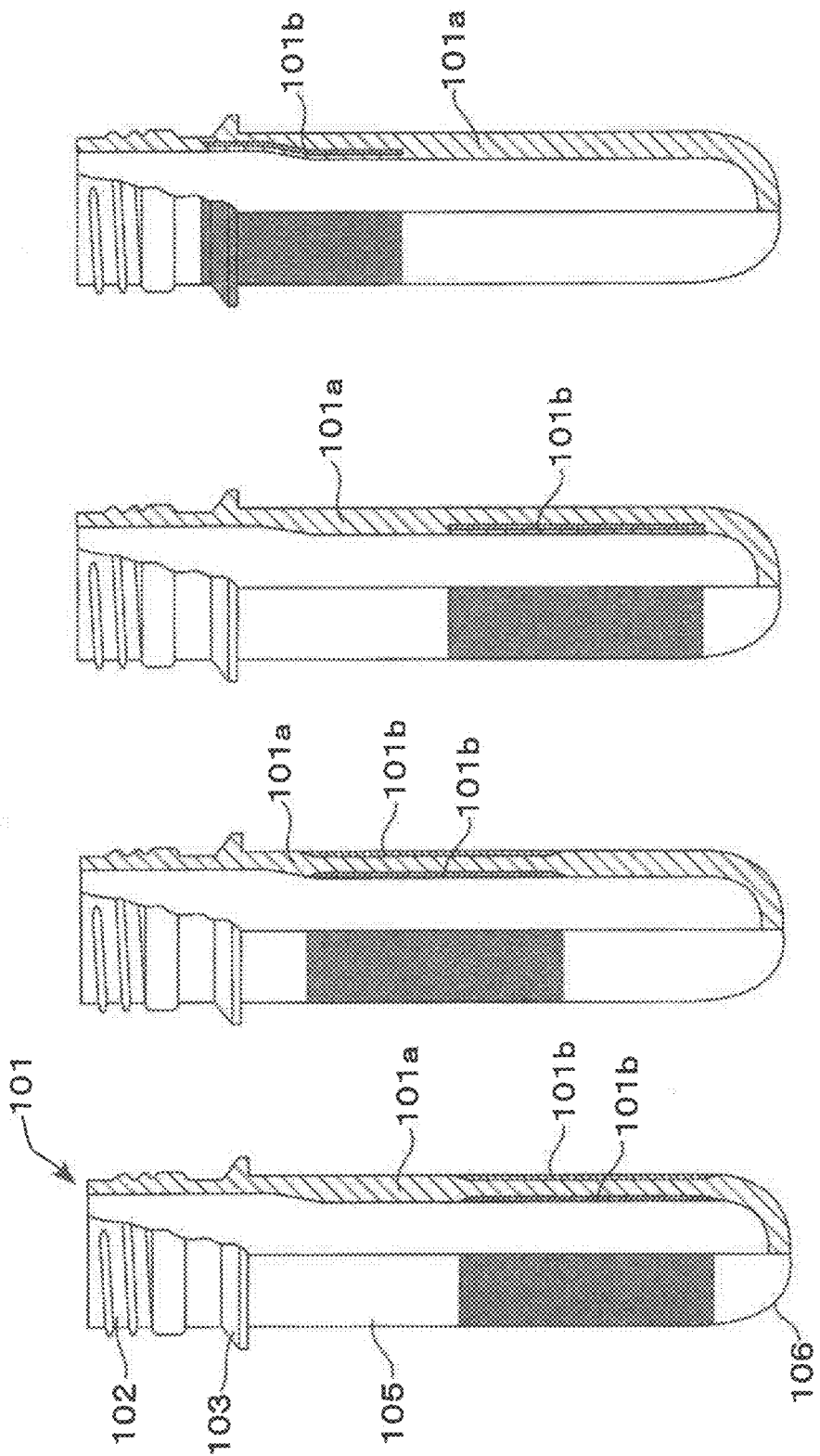

INJECTION MOLDING PROCESS FOR MAKING A PREFORM

This is a Divisional of Application No. 14/114,393, filed Oct. 28, 2013, now U.S. Pat. No. 9,862,157, which in turn is a U.S. National Stage Application No. PCT/JP2012/059625, filed Apr. 9, 2012, which claims the benefit of JP 2011-101939, filed Apr. 28, 2011. The disclosure of the prior applications is hereby incorporated by reference herein in its entirety.

TECHNICAL FIELD

This invention relates to a device for injection molding preforms, from which to blow mold those synthetic resin bottles having a colored layer or layers, to a process for injection molding preforms by using this device, and to biaxially drawn, blow molded synthetic resin bottles molded from those preforms molded by this injection molding process.

BACKGROUND ART

The bottles made of polyethylene terephthalate (PET) resins are obtained by biaxially drawing and blow molding the injection molded preforms in a test tube shape, and are used in various fields including beverages, foods, and cosmetics. A variety of decorating methods are used to differentiate the bottle products as merchandise. In many cases, the bottles are decorated with printed shrink films. In addition, bottles themselves are decorated by various methods.

Patent document D1 describes an invention relating to a preform having a double wall structure and to a process for biaxially drawing and blow molding such a preform to mold a colored bottle in which the color is gradated. This preform comprises an inner shell piece in a test tube shape made of a PET resin and an outer shell piece fitted around the inner shell piece. The outer shell piece is colored in a certain color density, and the thickness of the peripheral wall gradually becomes thin over an area starting from the bottom to an upper end of the body. However, the process described in this patent document D1 has low productivity and limited patterns of decoration.

Patent document D2 describes an invention relating to a preform formed by an injection molding device. According to D2, a colored resin layer is sandwiched between an outer surface resin layer and an inner surface resin layer by using a multi-nozzle device. The joined resin layers in a molten state are injected into, and fill a mold cavity to form a preform with the colored resin layer laminated as a middle layer. The document D2 also describes an invention relating to a bottle which is formed by biaxially stretching and blow molding this preform and is decorated with the colored resin layer. The process for injection molding the preform by using the multi-nozzle device to sandwich the colored resin layer between two main resin layers has a higher level of productivity than offered by the process described in the patent document D1.

PRIOR ART REFERENCES

Patent Documents

[Patent document D1] Published patent application JP1978-83884

[Patent document D2] Published patent application JP1990-98409

SUMMARY OF THE INVENTION

Problems to be Solved by the Invention

No detailed description is found in the patent document D2 as to how the colored resin is practically joined with the main resin inside the multi-nozzle device. Partly because of the effects of viscoelastic properties of molten resins, it is generally difficult to control with a high degree of accuracy the lamination behavior of the colored layer in response to various ways of decoration required for a bottle end product. The decorative aspects are also limited. In order to meet the requirement for high level decoration of bottle end products, it is necessary for the colored layer to be laminated in the peripheral wall of the preform by putting the colored layer at a certain position or positions in an axial direction and a radial direction (the direction of peripheral wall thickness) of the preform, and by changing layer thickness in a gradated manner so that the colored layer would have a certain thickness at a certain position. Thus in demand are an injection molding device including nozzles that can be used in various ways to laminate the colored layer accurately and an injection molding process using such a device.

Therefore, a technical problem of this invention is to create an injection molding device that can laminate a colored layer or layers with a main resin layer to form a peripheral wall of a preform by putting the colored layer with a high degree of accuracy at certain positions of the wall with at a certain thickness.

Another technical problem is to create an injection molding process using this device. The device and the process can be used to laminate the colored layer or layers in various ways to decorate the walls of biaxially stretched, blow molded bottles.

Means of Solving the Problems

This invention relates to an injection molding device used to mold preforms, an injection molding process, and synthetic resin bottles. The following descriptions will be made in the order of firstly the injection molding device, then the injection molding process, and finally the synthetic resin bottles. A main feature associated with the device of this invention is an injection molding device to be used molding a laminated preform which is used in biaxial stretching and blow molding, having a shape of a test tube and having a second resin layer or layers laminated with a main resin layer that makes up a shape of the preform, This injection molding device comprising a nozzle section, in which a molten main resin to be formed into a main resin layer is made to join a molten second resin to be formed into a second resin layer or layers so that a joined resin mass is formed, and a mold disposed ahead of this nozzle section, the nozzle section described in an order of from outside to inside comprising:

an outer flow channel through which the main resin flows, an inner flow channel through which the second resin flows, a cylindrical column-shaped joined flow channel where the second resin from the inner flow channel joins the main resin from the outer flow channel, a first confluence disposed at a point where the main resin from the outer flow channel flows into the joined flow channel, a second confluence disposed at a point where the second resin flows into the joined flow channel, wherein the first confluence is located downstream of the second confluence, with a predetermined space left in between, and a cylindrical shutoff pin inserted slidably in the joined flow channel, wherein this shutoff pin is capable of shutting off or opening either or both of the first confluence and/or the second confluence, depending on the sliding position, and wherein the resins are brought to join and flow through the joined flow channel together, while forming the joined resin mass in a cylindrical column-shape, and the joined resin mass is then injected into a mold cavity by way of a pin gate disposed at a position corresponding to the center of a bottom wall of the preform to be formed in the mold cavity.

According to the injection molding device having the feature described above, the nozzle section has the function of forming a joined resin mass by joining together the main resin and the second resin that represents a colored resin used for a decorative purpose. The nozzle section comprises a first confluence disposed at a point where the main resin from the outer flow channel flows into the joined flow channel, and a second confluence disposed at a point where the second resin flows into the joined flow channel. Depending on the sliding position of the shutoff pin, this pin works in such a manner that either or both of the first confluence and/or the second confluence is/are shut off or opened. The shutoff or open state of the first confluence and/or the second confluence can be controlled by the position of forefront of the shutoff pin in the following manner:

1) When the forefront is located downstream of the first confluence (i.e., at a downstream position), both the first and second confluences are shut off.

2) When the forefront is located between the first confluence and the second confluence, (i.e., at a middle position), the first confluence is in an open state, while the second confluence is shut off. In this case, only the main resin is supplied to the joined flow channel.

3) When the forefront is located upstream of the second confluence (i.e., at an upstream position), both the first and second confluences are in an open state, and the second resin is supplied to the joined flow channel, along with the main resin.

Because the above-described feature is based on a simple mechanism of linearly sliding the shutoff pin, this mechanism enables the first and second confluences to be shut off or opened with a high degree of accuracy. Conventionally, the supplies of resins have been shut off or opened by check valves or spool valves, which are disposed upstream of the nozzle section at positions remote from the joined flow channel. In comparison, this invention enables the resin supplies to be shut off or opened at the first and second confluences, which are quite near to the joined flow channel. Therefore, the shutoff and opening operations can be controlled with a higher degree of accuracy than before, while avoiding the time lag caused by the viscoelastic properties of the molten resins.

Another feature of the injection molding device of this invention is that in the main feature described above, each of the outer flow channel and the inner flow channel is provided with a diameter-reduced flow channel at the end of each cylindrical flow channel where the diameter of each flow channel becomes gradually reduced in a tapered manner toward the joined flow channel.

Still another feature of the injection molding device of this invention is that in the main feature described above, the sliding movement of the shutoff pin is controlled by a servomechanism.

According to the feature described above, the first confluence and/or the second confluence can be shut off or opened accurately with predetermined timing by using the servomechanism to control the sliding movement of the shutoff pin. Since the position of the forefront of the shutoff pin can be controlled with a high degree of accuracy, it is also possible to control accurately the extent to which the second confluence is opened.

Still another feature of the injection molding device of this invention is that in the feature described above, the shutoff pin is capable of adjusting the extent to which the second confluence is opened, depending on the sliding position of the forefront.

According to the servomechanism described above, the sliding position of the shutoff pin can be controlled accurately. Thus, the position of the forefront of the shutoff pin is adjusted near the second confluence so that the extent of opening can be accurately controlled to a desired state. For example, the supply of the second resin to be joined with the main resin can be gradually increased or decreased in a gradating manner.

A main feature associated with the injection molding process for a preforms according to this invention is a process using the injection molding device of this invention to injection mold a preform for use in biaxial stretching and blow molding, which preform has a shape of a test tube and has a second resin layer or layers laminated with a main resin layer made of a synthetic resin.

The injection molding process of this invention comprises the steps of:

a) keeping the first confluence in the open state by controlling the sliding position of the shutoff pin, and supplying the main resin from the outer flow channel to the joined flow channel for a predetermined time span;

b) supplying the second resin from the inner flow channel to the joined flow channel simultaneously with the main resin for a predetermined period of time within the predetermined time span by bringing the second confluence to an open state, and forming the joined resin mass of the main resin and the second resin in the joined flow channel;

c) injecting this joined resin mass into a mold cavity, by way of a pin gate disposed at a position corresponding to a center of a bottom wall of the preform, and filling the cavity with the mass; and d) laminating the second resin layer or layers with the main resin layer in a given embodiment, by setting an injection pattern including a start time, an ending time, and a supply velocity profile for the supply of the second resin, and also by setting an extent to which the second confluence is opened.

When injection molding of a preform is completed by the molding process described above, the forefront of the shutoff pin is located at the end of the joined flow channel in order to shut off the flow of resins from the joined flow channel to the pin gate. When injection molding of a next preform is started, the shutoff pin is slid upward to the upstream side, with the forefront of the pin being set at the middle position where the first confluence is opened to supply the joined flow channel with the main resin. Then, the shutoff pin is slid further upstream by delaying the motion for a given time (hereinafter, "time lag"). The forefront of the pin is located at the upstream position to open the second confluence and to allow the second resin to join the main resin. After a predetermined time, the forefront is set back to the middle position to shut off the supply of the second resin. Then, the forefront is brought back to the downstream position to shut off the supplies of entire molten resins and to complete the injection molding operation.

As described above, the injection molding device to be used can shut off or open the first confluence and/or the second confluence accurately with predetermined timing. Once a decision is made on the synthetic resins to be used and the shape of the preform including the peripheral wall thickness, while taking into consideration the time and speed of the main resin supply, it is possible to laminate the second resin layer or layers with the main resin layer in a given embodiment and to form a peripheral wall of a preform, by setting an injection pattern including a start time, an ending time, and a supply velocity profile for the supply of the second resin, and also by setting an extent to which the second confluence is opened. Meanwhile, various laminate patterns can be created by changing the supply conditions for the second resin.

Another feature associated with the injection molding process of this invention is that in the main feature described above, the second resin layer or layers is/are a decorative layer or layers made of a colored resin.

According to the molding process described above, the decorative layer or layers can be laminated with the main resin layer in various ways to form the peripheral wall of a preform, and therefore it becomes possible to offer bottles having various decorating properties. The second resin layer or layers should not be construed merely as decorative in this invention. The second resin layer or layers can also be a gas barrier layer or layers, a light shielding layer or layers, or other layers having some other functions. Thus, a laminate embodiment that is optimum to perform any of these functions is available, taking advantage of various laminate embodiments that can be accomplished with a high degree of accuracy.

Still another feature associated with the injection molding process of this invention is that when the supply of the main resin is started and then the supply of the second resin is started with predetermined time lag according to the main feature described above, this time lag for the start of the second resin supply is shortened, and the second resin is supplied at a higher speed than the speed of the main resin supply. This enables the late-coming second resin to plunge into a central portion of the preceding main resin and to break through a forefront portion of the preceding main resin to take a lead position in the joined flow channel or in the mold cavity. As a result, the second resin layers are formed and laminated onto both the outer and inner surfaces of the peripheral wall over a predetermined height range of the preform.

In a conventional molding process of this kind, in which the second resin joins the main resin in the joined flow channel, the second resin layer is usually laminated with the main resin layer as a middle layer embedded in the peripheral wall of the injection molded preform. According to the molding process described above, the time lag for the start of the second resin supply is shortened, and the second resin supply has a higher speed than the speed of the main resin supply. This enables the late-coming second resin to plunge into, and break through, the central portion of the preceding main resin. As a result, the second resin partially precedes the main resin when both resins flow through the mold cavity. Therefore, it becomes possible for the second resin layers to be laminated with the main resin on both the outer and inner surfaces of the peripheral wall over a predetermined height range of the preform.

Still another feature associated with the injection molding process of this invention is that in the main feature described above, the sliding position of the forefront of the shutoff pin is shifted so that the extent to which the second confluence opens is gradually changed in an opening direction or a shutting direction at or near this confluence. Such a gradual change at the second confluence would result in a change in the thickness of the second resin layers, which in turn, would form a gradated pattern in an axial direction.

According to the molding process described above, it is possible for a bottle end product to have a peripheral wall with gradated color shades by changing the thickness of, for example, decorative layers laminated in a gradating manner. Since the extent to which the second confluence is opened can be changed with a high degree of accuracy by controlling the sliding movement of the shutoff pin, the decorations in gradated patterns can be created variously in a sophisticated manner.

Still another feature associated with the injection molding process of this invention is that in the main feature described above, the sliding position of the forefront of the shutoff pin is shifted in a cyclic manner in the vicinity of the second confluence, and thereby the extent to which the second confluence is opened is made to undergo a cyclic change, so that the thickness of the second resin layer would be changed in the cyclic manner in the axial direction.

According to the molding process described above, it is possible for the bottle end product to have a peripheral wall with color shades changing in a cyclic manner in the axial direction, by changing the thickness of, for example, a decorative layer laminated in a cyclic manner in the axial direction.

A feature associated with the synthetic resin bottle of this invention is a synthetic resin bottle obtained by biaxially stretching and blow molding an injection molded preform, which has a test tube shape and has decorative layers made of a colored resin laminated with a main resin layer that makes up the shape of the bottle, wherein the main resin layer is a colored, opaque resin layer, and wherein the decorative layers are laminated with the main resin layer by the flow behavior of the main resin and the second colored resin at a time when the preform is injection molded and which are laminated in a predetermine height range onto the outer and inner surfaces of the peripheral wall.

The bottle having the above-described feature can be molded by biaxially stretching and blow molding the preform that has been injection molded by the injection molding process of this invention, especially by shortening the time lag for the start of second resin supply and supplying the second resin at a higher speed than the speed of the main resin supply. According to the above described feature, decorative effects can be produced even if the main resin layer is opaque because one of the decorative layers is laminated onto the outer peripheral surface.

Another feature associated with the synthetic resin bottle of this invention is a synthetic resin bottle obtained by biaxially stretching and blow molding an injection molded preform having a test tube shape and having a decorative layer made of a colored resin laminated with a main resin layer that makes up the shape of the bottle, wherein the main resin layer is transparent, and wherein the decorative layer is laminated with the main resin layer by the flow behavior of both the main resin and the colored second resin at a time when the preform is injection molded and which is laminated as a middle layer embedded in the main resin layer, but is disposed on a side quite near the inner surface of the peripheral wall.

The bottle having the above described feature can be molded by biaxially stretching and blow molding the preform that has been injection molded by the injection molding process of this invention. When the decorative layer is laminated as a middle layer embedded in the main resin layer and is disposed on a side quite near the inner surface of the peripheral wall, a color shade of the decorative layer can be developed and is visible through the clear main resin layer, which has sufficient thickness and is disposed mostly on the outer side of this decorative layer. This enables the bottle to have rich, high-grade decorations.

Effects of the Invention

The injection molding device of this invention is based on a simple mechanism of a straight sliding movement of the shutoff pin to shut off or open the first and second confluences, and this mechanism is at work in the portions close to the first confluence and the second confluence. Thus, the mechanism enables the second resin layer or layers to be laminated with the main resin layer to form the peripheral wall of the preform in various ways with a high degree of accuracy.

The injection molding device to be used for the injection molding process of this invention can shut off or open the first confluence and/or the second confluence accurately with predetermined timing, as described above. Once a decision is made on the synthetic resins to be used and the shape of the preform including the peripheral wall thickness, it is possible according this process to laminate the second resin layer or layers with the main resin layer in a given embodiment to form a peripheral wall of a preform, by setting an injection pattern including time lag for the supply of the second resin, an ending time, and a velocity of second resin supply, while taking into consideration the time and speed of the main resin supply, and also by setting an extent to which the second confluence is opened. Meanwhile, various laminate patterns can be created by changing the supply conditions for the second resin.

BRIEF DESCRIPTION OF THE DRAWINGS

FIGS. 8(a)-(d) are explanatory diagrams showing a comparison of laminate conditions for the preforms molded according to the injection patterns P1 to P4 in FIG. 4.

MODE OF CARRYING OUT THE INVENTION

Figure 1:
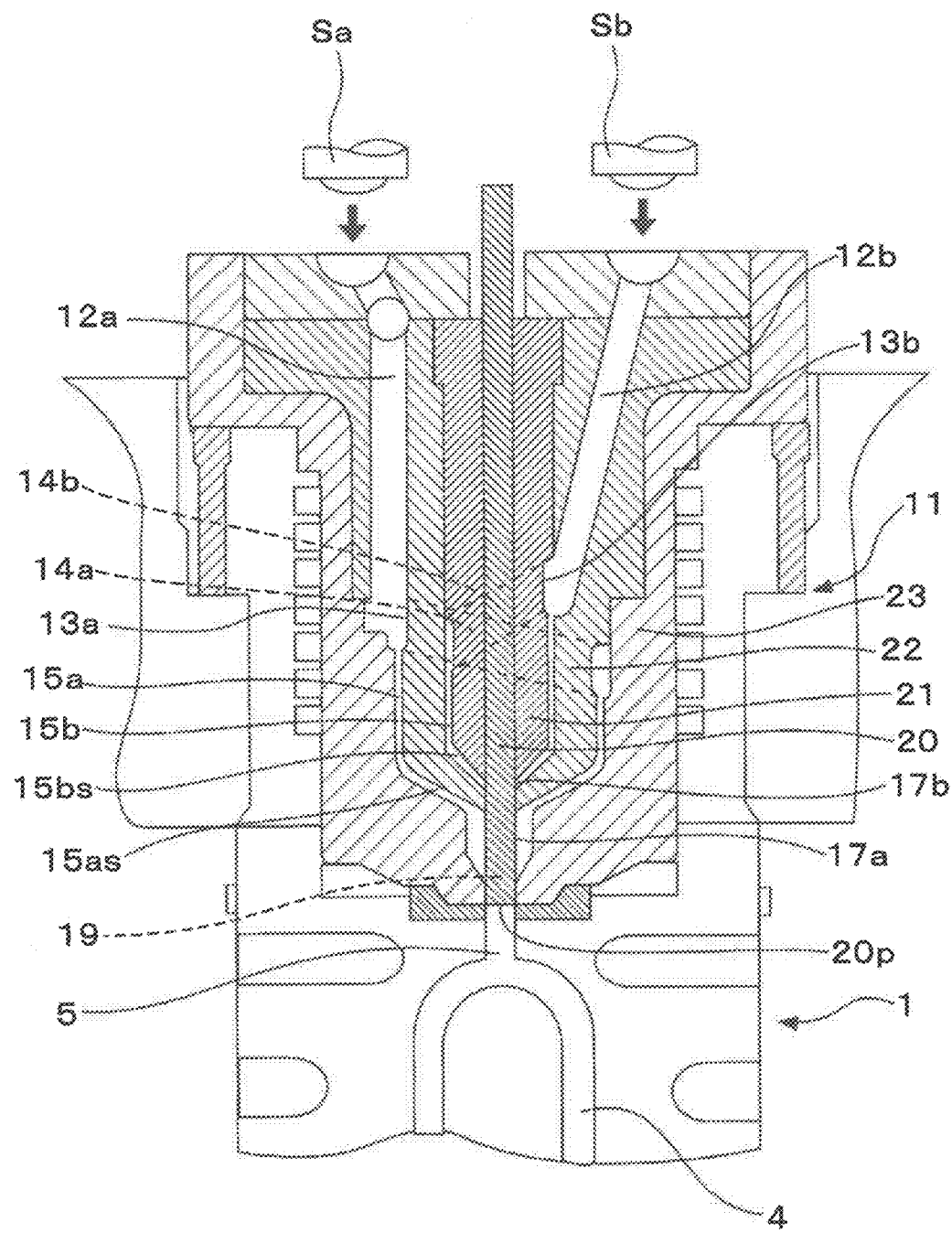
FIG. 1 is a schematic explanatory diagram showing a vertical section of an important part of the injection molding device in an embodiment of this invention.
Figure 2:
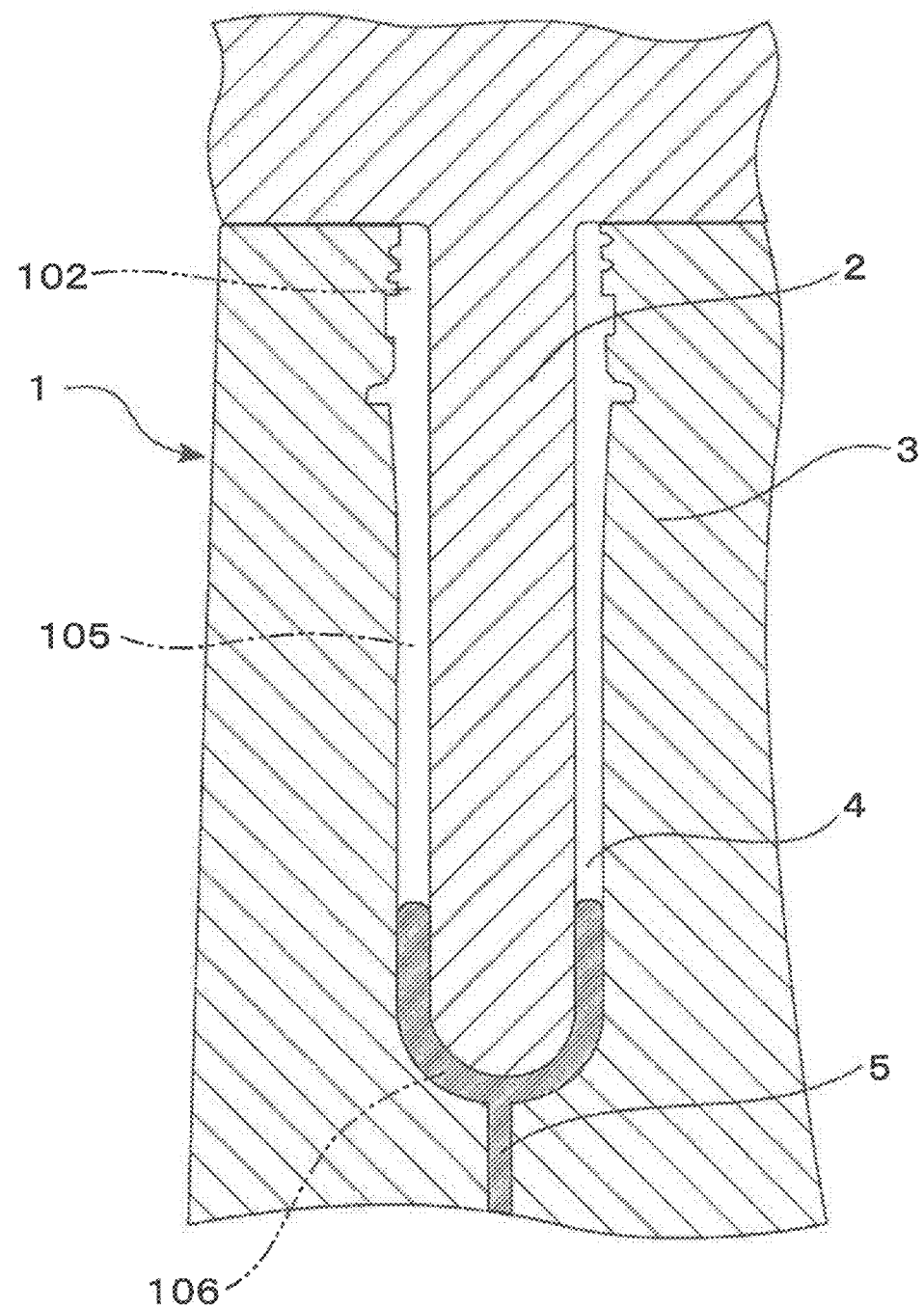
FIG. 2 is a vertical section of an embodiment of the mold for preform molding use.

The injection molding device, injection molding process, and bottle of this invention are further described with respect to embodiments, now referring to the drawings. FIGS. 1 and 2 schematically show the injection molding device of this invention, in which FIG. 1 is a vertical section of the device in the portions near the nozzle section 11, and FIG. 2 is a vertical section showing a schematic structure of the mold.

This nozzle section 11 has a first mandrel 21, a second mandrel 22, and a third mandrel 23 disposed in an order of from inside to outside, all of which are cylindrical in shape and are concentric on an axis. A cylindrical shutoff pin 20 is inserted into the first mandrel 21 in a manner capable of sliding upward or downward to perform the function of shutting off or permitting the flow of molten resins at the forefront of the shutoff pin 20. Each mandrel has a tapered portion at the leading end where the diameter is reduced toward the downstream side. A cylindrical outer flow channel 15a through which to flow the main resin Ra is formed between the third mandrel and the second mandrel. A cylindrical inner flow channel 15b through which to flow the second resin Rb is formed between the second mandrel and the first mandrel.

The main resin Ra and the second resin Rb are supplied respectively from resin feeders Sa and Sb, each of which is provided with a screw extruder or an accumulator having a plunger at the tip of the extruder. The resins Ra and Rb are sent to guide channels 12a and 12b, respectively, and are introduced into the outer flow channel 15a or the inner flow channel 15b from inlet ports 13a or 13b through manifolds 14a or 14b.

The main resin Ra passes through a tapered flow channel 15as disposed at the end of the outer flow channel 15a, and through a first confluence 17a, enters a cylindrical column-shaped joined flow channel 19. The second resin Rb passes through a tapered flow channel 15bs disposed at the end of the inner flow channel 15b, and through a second confluence 17b, enters the joined flow channel 19, in which the main resin Ra and the second resin Rb join together to form a joined resin mass. The joined resin mass is injected into, and fills up, a cavity 4 comprising a core mold 2 and a cavity mold 3 of the mold 1, by way of a pin gate 5 disposed at a position corresponding to the center of a bottom wall of a bottom 106 of a preform 101.

The first confluence 17a is at a point where the outer flow channel 15a meets the joined flow channel 19, and the second confluence 17b is at a point where the inner flow channel 15b meets the joined flow channel 19. The first confluence 17a is disposed downstream of the second confluence 17b, with a predetermined space from the second one. Since the confluences are set up in this way, the sliding position of the shutoff pin 20, and especially the position of the forefront 20p thereof, would function so that either or both of the first confluence 17a and/or the second confluence 17b can be opened and/or shut off. The sliding movement (in the upward or downward direction in FIG. 1) of the shutoff pin 20 is controlled by a servo-mechanism using a servo motor (not shown in the drawings).

Figure 3:
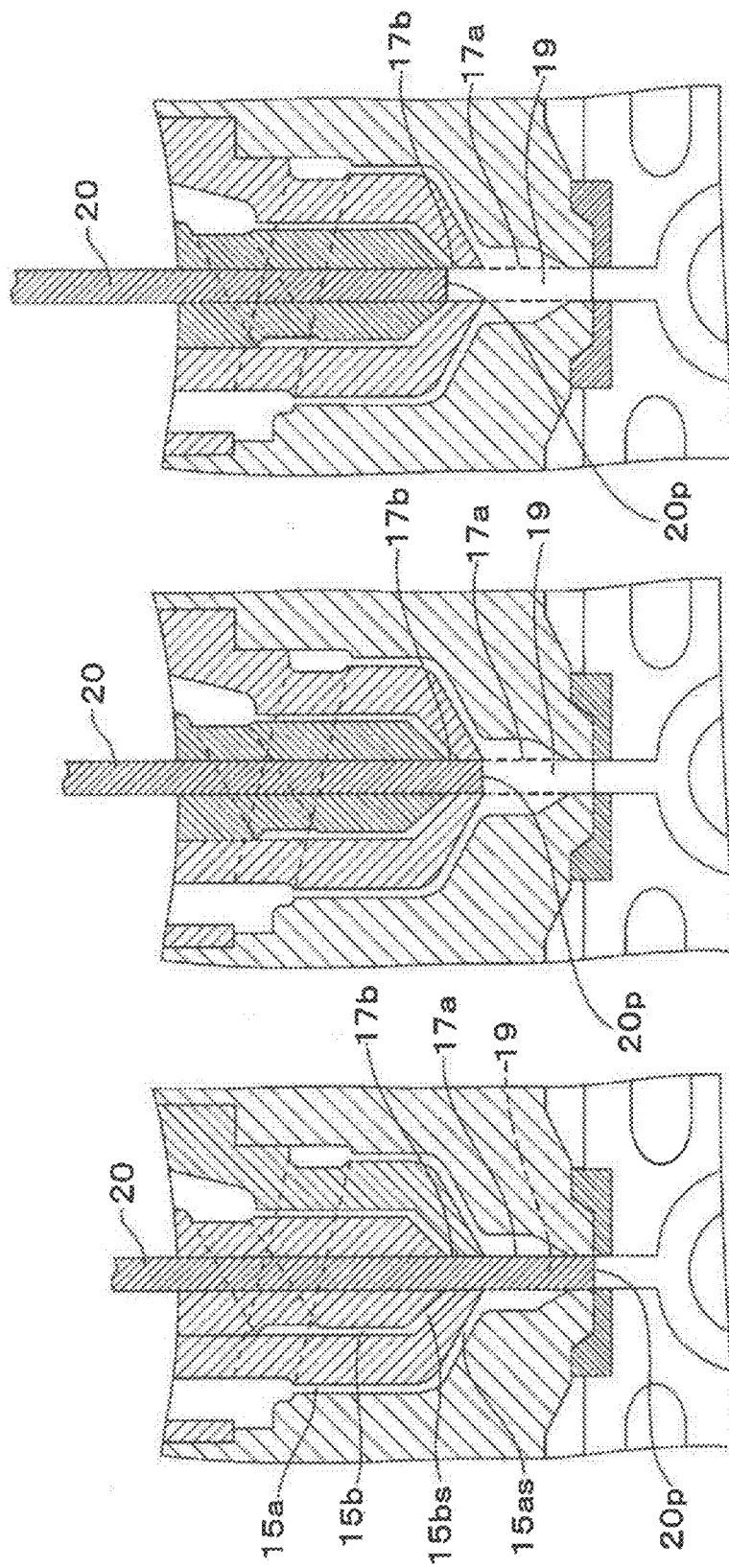
FIGS. 3(a)-(c) are explanatory diagrams showing the sliding positions of the shutoff pin used in the injection molding device of FIG. 1.

FIG. 3 are explanatory diagrams showing typical sliding positions of the shutoff pin 20 inside the injection molding device of FIG. 1. In FIG. 3(a), the forefront 20p is located downstream of the first confluence 17a, i.e., at the end of the nozzle section 11, as depicted in FIG. 1. Under this condition, both the first confluence 17a and the second confluence 17b are in a shutoff state. As shown in FIG. 3(b), the forefront 20p is at a position between the first confluence 17a and the second confluence 17b. Under this condition, the first confluence 17a is open, while the second confluence 17b is shut off. Therefore, only the main resin Ra is supplied to the joined flow channel 19. If the forefront 20p is located upstream of the second confluence 17b, as shown in FIG. 3(c), then both the first confluence 17a and the second confluence 17b are in the open state, and both the main resin Ra and the second resin Rb are supplied to the joined flow channel.

The shutting or opening operation for each confluence is controlled by a simple mechanism of linearly sliding the shutoff pin 20. In addition to this mechanism, a servo mechanism is also used to control the sliding movement of the shutoff pin 20, as described above. Thus, the position of the forefront 20p of the shutoff pin 20 can be shifted to any predetermined position accurately with predetermined timing. Therefore, the first confluence 17a and the second confluence 17b can be shut off or opened with a high degree of accuracy. Furthermore, the extent to which the second confluence 17b is opened can be adjusted accurately between a complete shutoff state and a full open state.

Conventionally, the resin supplies have been shut off or opened by check valves or spool valves, which are disposed upstream of the nozzle section at positions remote from the joined flow channel 19. In comparison, this invention enables the molten resin supplies to be shut off or opened at the first confluence 17a and second confluence 17b, which are quite near the joined flow channel 19. Therefore, the shutoff and supplying operations can be controlled with a higher degree of accuracy than in prior art, while avoiding the time lag caused by the viscoelastic properties of the molten resins.

Figure 4:
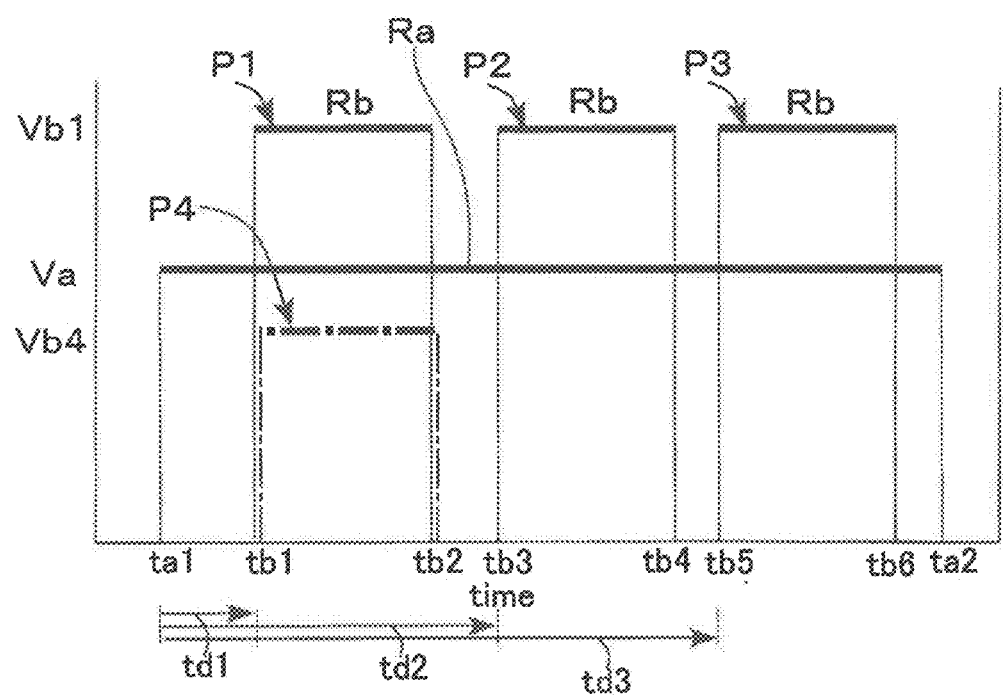
FIG. 4 is an explanatory diagram showing an example of the injection patterns used by the injection molding process of this invention

The process of this invention for injection molding the preform by using the above-described injection molding device is now described. FIG. 4 is an explanatory diagram showing injection patterns according to which the preform 101 is injection molded by the injection molding device shown in FIG. 1. Four injection patterns P1 to P4 are shown, taking the horizontal axis as time and the vertical axis as speed of molten resin supply. The pattern for the supply of the main resin Ra is common to these four patterns, and the second resin Rb has different supply patterns.

Descriptions will be made to explain the process for molding the preform based on the injection pattern P1 shown in FIG. 4 and the bottle of this invention made by biaxially stretching and blow molding this preform, now referring to FIGS. 5, 6, and 7. It is premised in the descriptions that the second resin Rb is a colored resin and that a second resin layer or layers 101b is/are a decorative layer or layers. In the case of the pattern P1, the supply of the main resin Ra starts at time ta1, continues at a constant supply velocity Va, and ends at time tat. The supply of the colored resin Rb starts at time tb1, separated by a delayed time td1 from the start time ta1 for the supply of the main resin Ra, continues at a higher supply velocity Vb1 than the supply velocity Va for the main resin Ra, and ends at time tb2.

Figure 5A:
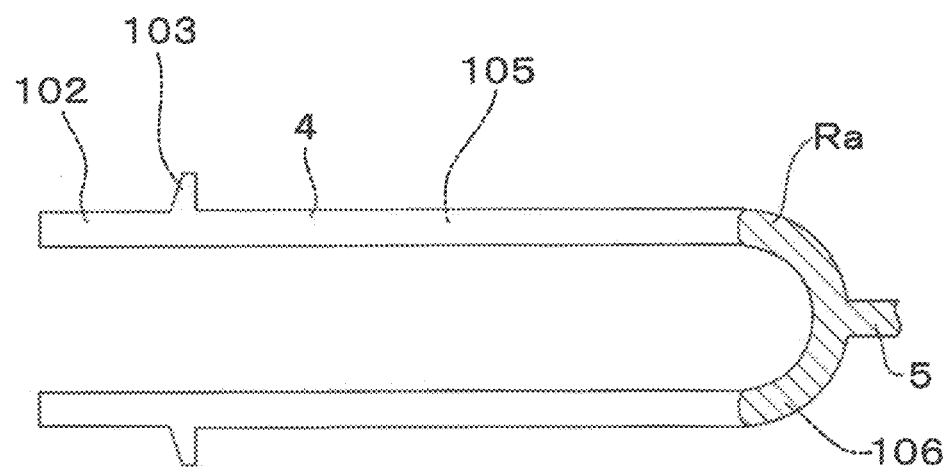
FIGS. 5(a)-(c) are schematic explanatory diagrams showing steps of filling the mold cavity with molten resins according to an injection pattern P1 in FIG. 4.
Figure 5B:
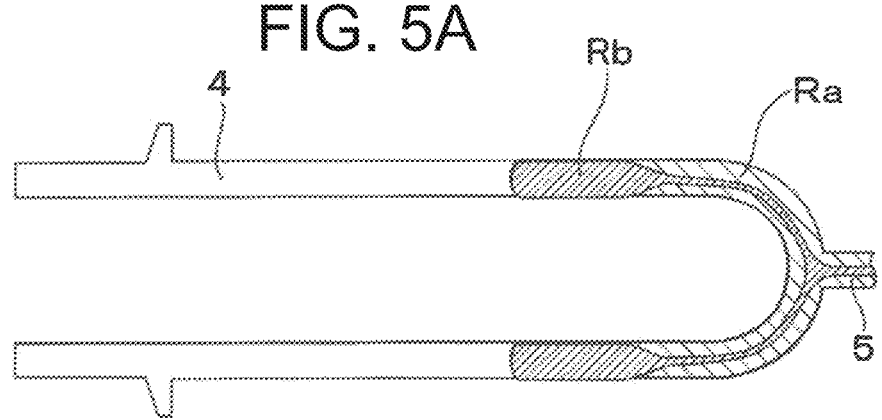
Figure 5C:
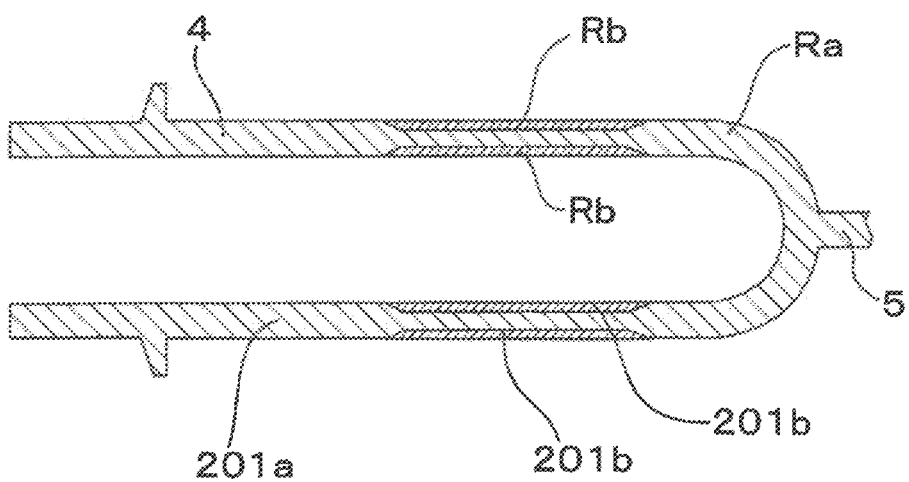
Figure 6:
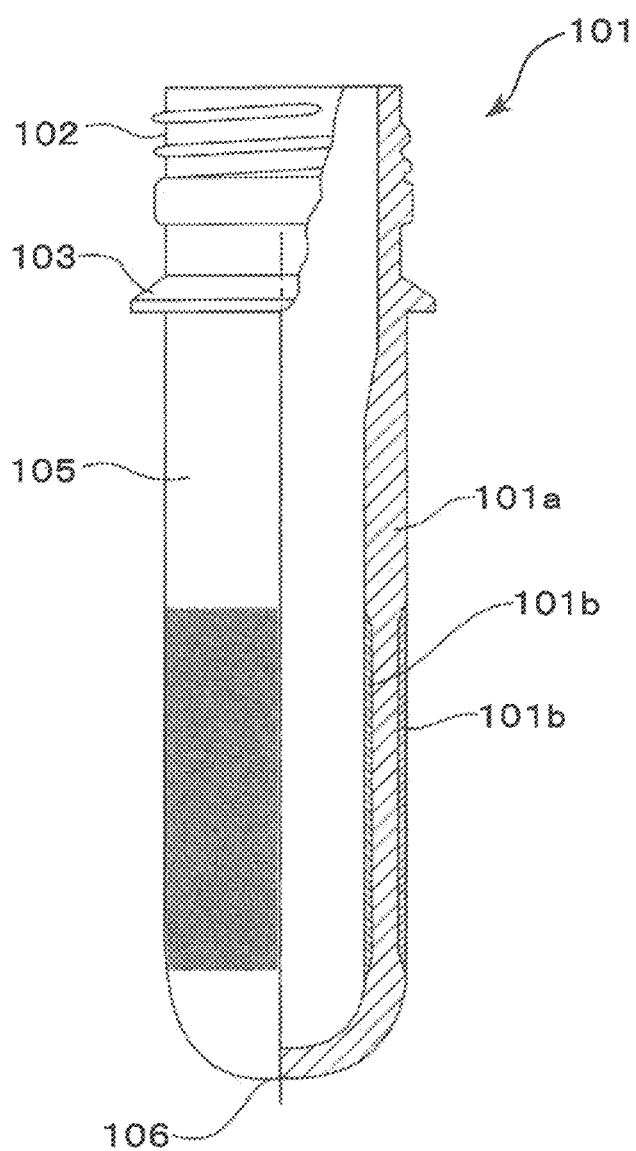
FIG. 6 is a front view, with a vertical section on the right side, of a preform molded according to the injection pattern P1 in FIG. 4.
Figures 7A, 7B:
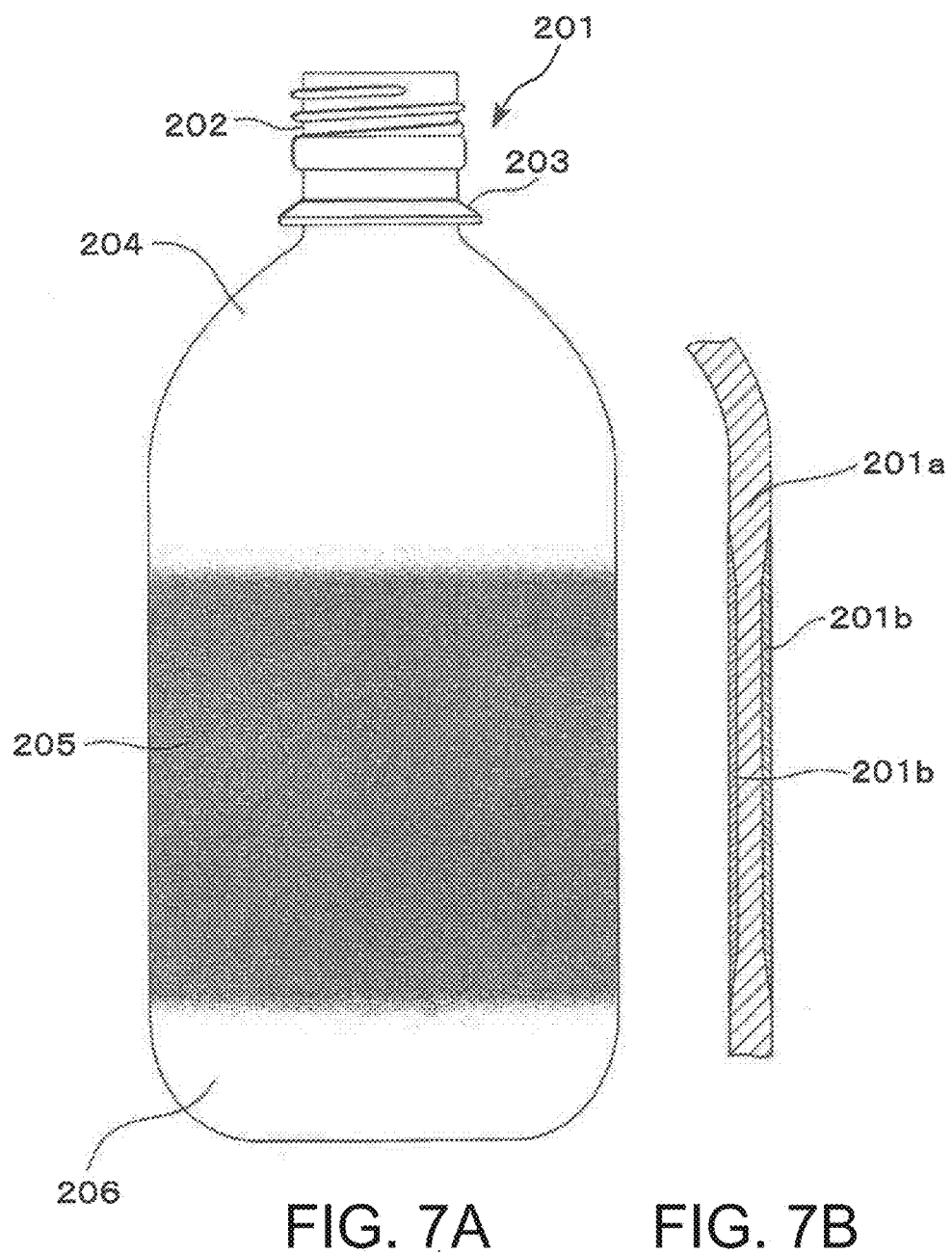
FIG. 7(a) is a front view of the bottle in an embodiment of this invention, and FIG. 7(b), a vertical section of peripheral wall of this bottle biaxially stretched and blow molded from the preform of FIG. 6.

FIGS. 5(a)-(c) are schematic explanatory diagrams showing steps of filling the cavity 4 of the mold 1 with molten resins according to the injection pattern P1. FIG. 6 is a front view, with a vertical section in a half, of the preform 101 injection molded under the pattern P1. FIG. 7(a) is a front view, and FIG. 7(b) is a vertical section of peripheral wall of the bottle 201 in an embodiment of this invention, which has been biaxially stretched and blow molded from the preform 101 in FIG. 6. The preform 101 shown in FIG. 6 has a shape of a test tube and comprises a neck 102, a neck ring 103, a body 105, and a bottom 106. The preform has a total height of 100 mm, and the body 105 has an outer diameter of 20 mm and an average wall thickness of 2.5 mm. The peripheral wall comprises an opaque main resin layer 101a made of a PET resin colored in white with a pigment, and decorative layers 101b made of the same PET resin, but colored in red with another pigment, and laminated onto the main resin layer 101a.

For the main resin Ra, the pattern P1 sets a supply time of 4.1 sec and a supply velocity Va of 4.0 ml/sec. For the colored resin Rb, it sets a delayed time td1 of 1.5 sec till the supply start, an injection time of 0.5 sec, and a supply velocity Vb1 of 10.5 ml/sec. FIG. 5(a) shows a situation just before time tb1; FIG. 5(b), just before time tb2; and FIG. 5(c), at time ta2, i.e., a situation in which filling has completed. At the time ta1, the forefront 20p of the shutoff pin 20 shifts from the downstream position of FIG. 3(a) to the middle position of FIG. 3(b) so that the first confluence 17a is opened to supply the main resin Ra at a supply velocity Va. Just before the time tb1, the main resin Ra advances from the bottom 106 of the cavity 4 to a position corresponding to a lower end of the body 105, as shown in FIG. 5(a).

At the time tb1, after the delayed time td1 from the time ta1, the position of the forefront 20p is shifted from the middle position of FIG. 3(b) to the upstream position of FIG. 3(c). At this forefront position, both the first confluence 17a and the second confluence 17b are open. The main resin Ra is supplied at the velocity Va, and the colored resin Rb is supplied at the velocity Vb1, which is higher than Va.

In the state of FIG. 5(a), cooling of the main resin Ra is in progress in the vicinity of mold surfaces facing the cavity 4, and the resin becomes solidified and has an increasingly high level of melting viscosity. However, in the central portion of the cavity 4, remote from the mold surfaces, a high temperature is still maintained by setting the delayed time td1 at 1.5 sec. When supplied at a higher supply velocity Vb1, the colored resin Rb plunges into a central portion of the preceding main resin Ra and breaks through a forefront portion of the preceding main resin Ra. At the time tb2, the second resin partially precedes the main resin Ra, as shown in FIG. 5(b).

Then at the time tb2, the forefront 20p is shifted to the middle position shown in FIG. 3(b). The second confluence 17b is shut off to stop the supply of the colored resin Rb. The supply of only the main resin Ra continues at a velocity of Va. Under this condition, this time in the other way round, the main resin Ra plunges into a central portion and breaks through a forefront portion of the colored resin Rb, and at the time tat, fills up the rest of the cavity 4, as shown in FIG. 5(*c*).

From the state of FIG. 5(*b*), the colored resin Rb is further cooled in the vicinity of mold surfaces facing the cavity 4, but in the central portion of the cavity 4, the colored resin Rb still continues to flow along the cavity walls due to the flow of the main resin Ra. As a result, the colored resin Rb thinly comes in contact with the mold walls of the cavity 4 over a predetermined range, as shown in FIG. 5(*c*). As seen in the injection molded preform 101 of FIG. 6, the decorative layers 101*b* are laminated onto the outer and inner peripheral surfaces of the main resin layer 101*a* in a sandwich configuration in a portion of the body 105 ranging over a roughly lower half height.

FIG. 7(*a*) shows a bottle 201 obtained by biaxially stretching and blow molding this preform 101. As shown in FIG. 7(*b*), the vertical section of the peripheral wall has taken over the laminate embodiment from the preform 101 in the lower half portion of a body 205. In this embodiment, a main resin layer 201*a* is sandwiched between decorative layers 201*b*, which are laminated onto the inner and outer surfaces of the main resin layer 201*a*. In this laminate embodiment, one of the decorative layers 201*b* is laminated onto the outer surface of the main resin layer 201*a*. Even if the main resin Ra is colored in white and is oblique, the bottle can be decorated with a red-colored decorative layer 201*b* on the outermost peripheral surface. Conventionally, a colored resin has been laminated as a middle layer embedded in the main resin layer if the preform is injection molded by utilizing a multi-nozzle section to join the main resin with the colored resin. In that case, decoration has not been sufficient if the main resin layer is colored and opaque.

FIGS. 8(*a*)-(*d*) are explanatory diagrams showing a comparison of laminate conditions for the preforms molded according to the injection patterns P1 to P4 in FIG. 4. The preforms of FIGS. 8(*a*) to (*d*) are based on the patterns P1 to P4, respectively. The patterns P2, P3, and P4 shown in FIG. 4 will be described below in comparison with P1. P2 is a pattern having a longer delayed time td2, as compared to P1. With a longer delayed time td2, the colored resin Rb is supplied after the cavity 4 has been filled with an appreciable amount of the main resin Ra in the stage of FIG. 5(*a*). If the operation goes at this rate, the area laminated with the decorative layers 101*b* would come close to the neck ring 103, as shown in FIG. 8(*b*). In other words, the length of time lag can change the position of the decorative layers 101*b* laminated with the main resin layer 101*a*.

P3 is a pattern having a still longer delayed time td3 up to 3.5 sec. With a delayed time this long, the cooling of the main resin Ra proceeds in the area near gate 5 of the cavity 4. Therefore, the colored resin Rb cannot break through the central portion of the main resin Ra. In that case, the decorative layer 101*b* is laminated as a middle layer embedded in the main resin layer 101*a*, and shows a laminate condition shown in FIG. 8(*c*).

P4 is a pattern having a lower supply velocity Vb4 than in P1. The colored resin Rb cannot break through the central portion of, and outrun, the main resin Ra. In this case, too, the decorative layer 101*b* is laminated as a middle layer embedded in the main resin layer 101*a* in a portion of the peripheral wall of the preform 101, as shown in FIG. 8(*d*). Incidentally in this pattern, the position of the area in which to laminate the decorative layer 101*b* can be shifted by changing the delayed time. Since in the cases of P3 and P4, the decorative layer 101*b* is laminated as a middle layer, its decorative effect can be achieved by using a transparent type of the main resin layer 101*a*.

Figure 9:
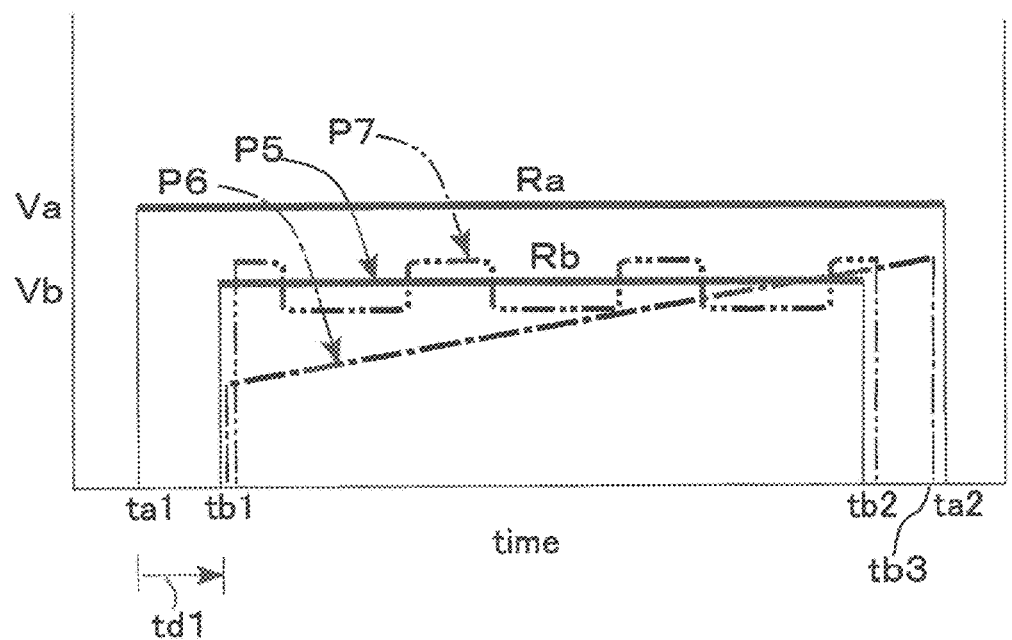
FIG. 9 is an explanatory diagram showing other examples of injection patterns.
Figure 10:
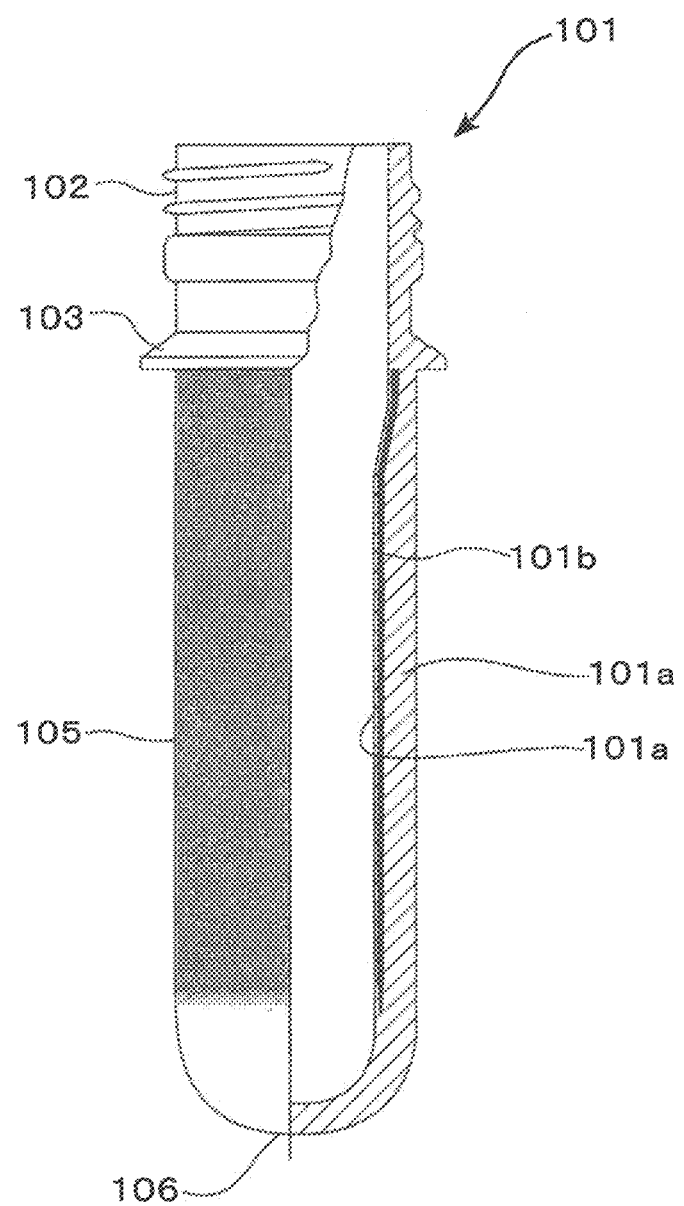
FIG. 10 is a front view, with a vertical section on the right side, of a preform molded according to the injection pattern P5 in FIG. 9.

FIG. 9 is an explanatory diagram showing other three injection patterns P5, P6, and P7. In these patterns, the colored resin Rb has supply velocities Vb that are slower than the supply velocity Va for the main resin Ra. In all these cases, the peripheral wall of the preform 101 has the decorative layer 101*b* laminated as a middle layer embedded in the main resin layer 101*a*. The pattern P5 resembles P4 of FIG. 4, but has a longer injection time. FIG. 10 shows a decorative layer 101*b* in the peripheral wall of the preform 101. As shown, the decorative layer 101*b* ranges from just under the neck ring 103 to a lower end of the body 105, and is laminated with the main resin layers 101*a* at a substantially uniform layer thickness.

Figures 11A, 11B:
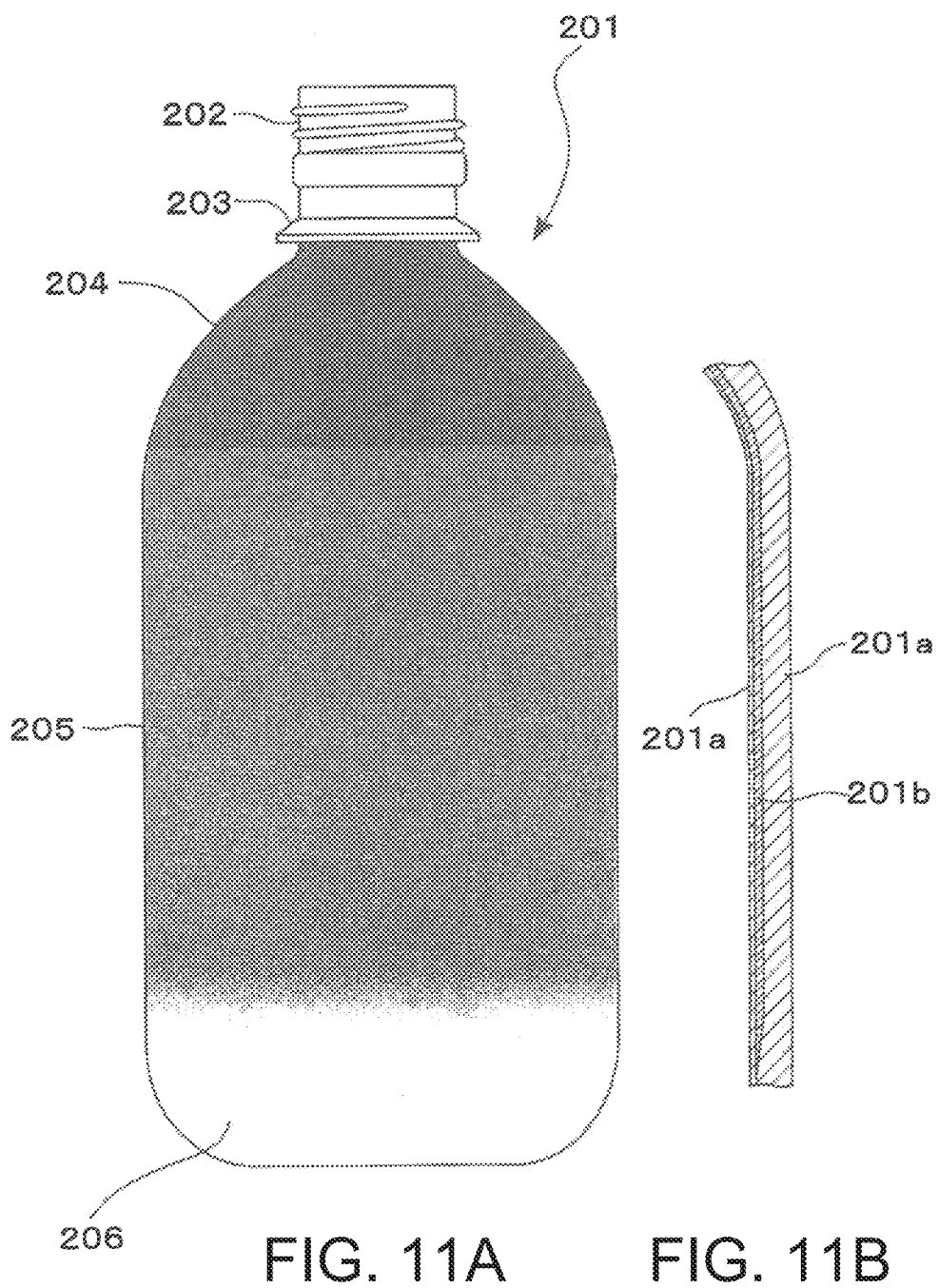
FIG. 11(a) is a front view.
FIG. 11(b) is a vertical section of the peripheral wall, of the bottle biaxially stretched and blow molded from the preform of FIG. 10.

When the preform 101 is molded according to the pattern P5 by using the injection molding device of FIG. 1, the decorative layer 101*b* is laminated as a middle layer embedded in the main resin layers 101*b*, and is disposed quite near the inner peripheral wall surface. This feature of the middle layer quite near the inner surface is inherited by the bottle when this preform 101 is biaxially stretched and blow molded into the bottle 201, as shown in FIG. 11. Thus, in the bottle 201 of FIG. 11(*a*), the decorative layer 201*b* is a middle layer embedded in the main resin layers 201*a*, and is disposed quite near the inner peripheral wall surface, as shown in the vertical section of the peripheral wall of FIG. 11(*b*). If the main resin layer 101*a* to be used is transparent, then a color shade of this decorative layer 201*b* would shine through an outer laminated, transparent main resin layer 201*a* having a sufficient thickness and can offer rich, high-grade decoration. Furthermore, thickness of the decorative layer 101*b* can be changed by adjusting the supply velocity Vb, which in turn, is changed by adjusting the extent to which the second confluence 17*b* is opened by the movement of the shutoff pin 20. Color density of the decorative layer can be changed in response to the purpose of decoration for the bottle 201.

Figure 12:
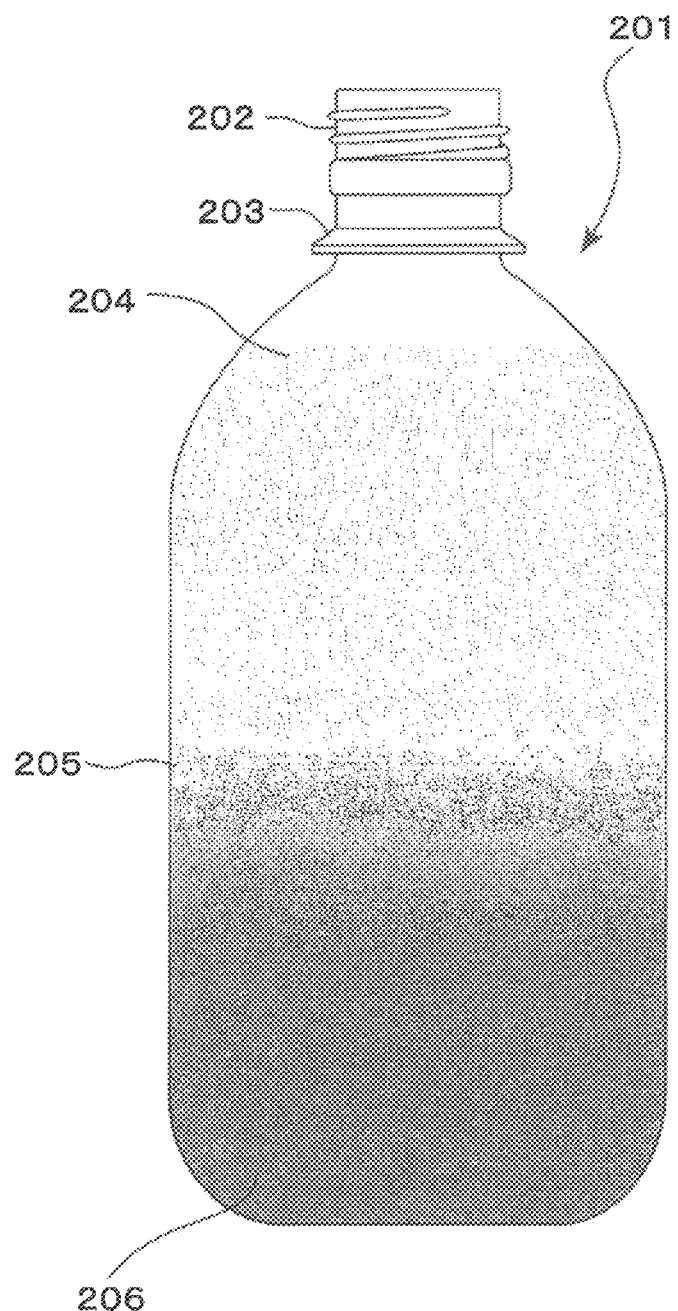
FIG. 12 is a front view of the bottle biaxially stretched and blow molded from the preform molded according to the injection pattern P6 of FIG. 9.

According to the pattern 6, the sliding position of the forefront 20*p* of the shutoff pin 20 is shifted so that the extent to which the second confluence 17*b* is opened is changed gradually in the opening direction, and along with this change, the supply velocity Vb is increased consistently from the time tb1 to the time tb3. This pattern P6 gives an end product of the bottle 201 such as shown in FIG. 12. In this bottle 201, a color shade caused by the decorative layer 201*b* creates a gradated pattern of decoration, in which the color density gradually increases downward from the shoulder 204 to a lower end of the body 205. Obviously, the color density can be gradually decreased in a pattern of top-to-bottom gradation, if the extent to which the second confluence 17*b* is opened is changed gradually in the closing direction.

Figure 13:
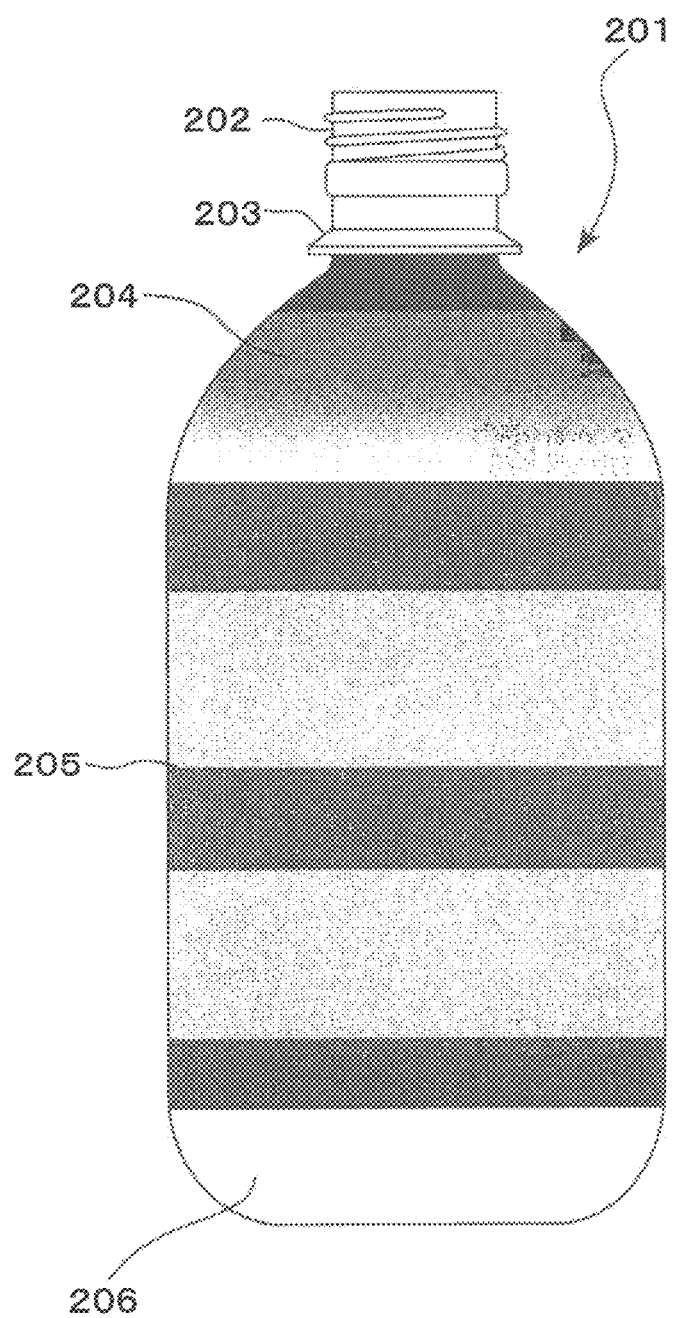
FIG. 13 is a front view of the bottle biaxially stretched and blow molded from the preform molded according to the injection pattern P7 of FIG. 9.

According to the pattern P7, the sliding position of the forefront 20*p* of the shutoff pin 20 is shifted periodically in the vicinity of the second confluence 17*b* in order to change periodically the extent to which the second confluence 17*b* is opened, so that the decorative layer 101*b* of the preform 101 would give a pattern of lamination showing periodical changes in the axial direction. As found in FIG. 13, the bottle 201, an end product based on this pattern P7, shows a pattern of decoration in which dark colored zones and light colored zones are alternately disposed. As a variation of P7, the decorative layer 201*b* is laminated in a zone and not laminated in another zone, with two types of horizontal zones being alternately disposed in the axial direction. This can be achieved by repeating periodically the open state and the shutoff state at the second confluence 17b.

This invention has been described with respect to some embodiments, but it is to be understood that this invention is not construed as being limited to these embodiments. The synthetic resins to be used are not limited to PET resins, but PP resins and other resins that have been conventionally used in biaxially stretched, blow molded bottles can be used as well. The main resin and the colored resin may not always be of the same type, but other types of resins can also be used. In addition, if a high gas barrier resin, such as a nylon resin, is used as a colored resin, the bottle obtained would have color decoration and a high gas barrier property. Furthermore, various laminate embodiments can be achieved by using the second resin layer as, for example, a gas barrier layer, a light shielding layer, or a layer having another function. This feature can be advantageously used to achieve an optimum laminate embodiment and to perform these functions fully.

The inner flow channel 15b for the second resin Rb is not limited to the cylindrical shape. For example, it can be a flow channel in a shape of a thin plate. The second resin Rb running through a thin-plate flow channel forms a strip-shaped decorative zone in the vertical direction over a predetermined range.

INDUSTRIAL APPLICABILITY

According to the preform molding process using the injection molding device of this invention, the decorative layer or layers can be laminated with the main resin layer with a high degree of accuracy in various embodiments. Thus, it is possible to offer bottles having decorations that haven't existed before. Wide applications of use are expected for these bottles.

DESCRIPTIONS OF REFERENCE SIGNS

1. Mold
2. Core mold
3. Cavity mold
4. Cavity
5. Gate
11. Nozzle section
12a, 12b. Guide channel
13a, 13b. Inlet port
14a, 14b. Manifold
15a. Outer flow channel
15b. Inner flow channel
15as, 15bs. Diameter-reduced flow channel
17a. First confluence
17b. Second confluence
19. Joined flow channel
20. Shutoff pin
20p. Forefront
21. First mandrel
22. Second mandrel
23. Third mandrel
Ra. Main resin
Rb. Second resin (Colored resin)
Sa, Sb. Resin feeder
101. Preform
101a. Main resin layer
101b. Second resin layer (Decorative layer)
102. Neck
103. Neck ring
105. Body
106. Bottom
201. Bottle
201a. Main resin layer
201b. Decorative layer
202. Neck
203. Neck ring
204. Shoulder
205. Body
206. Bottom

The invention claimed is:

1. A injection molding process for making a preform by an injection molding device to be used molding the preform used in biaxial stretching and blow molding, the preform having a shape of a test tube and having a second resin layer or layers laminated with a main resin layer that makes up a shape of the preform, the injection molding device having a nozzle section, in which a molten resin to be formed into the main resin layer is made to join a molten second resin to be formed into the second resin layer or layers so that a joined resin mass is formed, and a mold disposed ahead of the nozzle section, the nozzle section being arranged in an order from outside to inside including:
  an outer flow channel through which the main resin flows,
  an inner flow channel through which the second resin flows,
  a cylindrical column-shaped joined flow channel where the second rein from the inner flow channel joins the main resin from the outer flow channel,
  a first confluence disposed where the main resin from the outer flow channel flows into the joined flow channel,
  a second confluence disposed where the second resin flows into the joined flow channel, wherein the first confluence is disposed downstream of the second confluence with a predetermined space between the confluence first and the second confluence, and
  a cylindrical shutoff pin inserted slidably in the joined flow channel, wherein the shutoff pin is capable of closing or opening either or both of the first confluence and second confluence based on a sliding position of the shutoff pin,
the injection molding process comprising the steps of:
  maintaining the first confluence in an open state while controlling the sliding position of a shutoff pin, and supplying the main resin from the outer flow channel to the joined flow channel at a predetermined time span;
  supplying the second resin from the inner flow channel to the joined flow channel simultaneously with the main resin for a predetermined period of time within the predetermined time span by bringing the second confluence to an open state, and forming the joined resin mass of the main resin and the second resin in the joined flow channel;
  injecting the joined resin mass cylindrically joined at the joined flow channel into the cavity of the mold, by way of the pin gate and filling the cavity with the joined resin mass; and
  while the supply of the main resin is maintained, stopping supply of the second resin with the second confluence part in a shut off state such that the main resin plunges into a central portion of the second resin and breaks through a forefront portion of the second resin.

2. The process for making the preform according to claim 1, wherein the second resin layer or layers is/are a decorative layer or layers made of a colored resin.

3. The process for injection molding the preform according to claim 1, wherein
the sliding position of the forefront of the shutoff pin is shifted in a vicinity of the second confluence such that the opening of the second confluence is gradually changed in an opening direction or a shutting direction, and
the shift in position of the sliding position causes a gradual change in thickness of the second resin layers thereby forming a gradated pattern on the peripheral wall in an axial direction.

4. The process for injection molding the preform according to claim 2, wherein the sliding position of the forefront of the shutoff pin is shifted in a cyclic manner in the vicinity of the second confluence and thereby the extent to which the second confluence is opened is made to undergo a cyclic change, so that the thickness of the second resin layer is changed in the cyclic manner in the axial direction.

5. The process for injection molding the preform according to claim 2, wherein the sliding position of the forefront of the shutoff pin is shifted in a vicinity of the second confluence in a manner that the extent to which this second confluence opens is gradually changed in an opening direction or a shutting direction and that such a shift of position would lead to a gradual change in thickness of the second resin layers and result in a gradated pattern formed on the peripheral wall in an axial direction.

6. The process for injection molding the preform according to claim 2, wherein the sliding position of the forefront of the shutoff pin is shifted in a cyclic manner in the vicinity of the second confluence and thereby the extent to which the second confluence is opened is made to undergo a cyclic change, so that the thickness of the second resin layer would be changed in the cyclic manner in the axial direction.

* * * * *